United States Patent
Li (10) Patent No.: US 8,866,781 B2
(45) Date of Patent: Oct. 21, 2014

(54) CONTACTLESS GESTURE-BASED CONTROL METHOD AND APPARATUS

(71) Applicant: Huawei Technologies Co., Ltd., Shenzhen (CN)

(72) Inventor: Yingtao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/875,476

(22) Filed: May 2, 2013

(65) Prior Publication Data

US 2013/0307765 A1  Nov. 21, 2013

Related U.S. Application Data

(63) Continuation of application No. PCT/CN2012/075798, filed on May 21, 2012.

(51) Int. Cl.
G06F 3/0488 (2013.01)
G06F 3/01 (2006.01)

(52) U.S. Cl.
CPC ........................ G06F 3/017 (2013.01)
USPC ............ 345/173; 382/181; 715/773; 715/863

(58) Field of Classification Search
USPC ........... 345/173; 382/181, 185–189; 715/780, 715/863, 773
See application file for complete search history.

(56) References Cited

U.S. PATENT DOCUMENTS 5,203,704 A * 4/1993 McCloud ...................... 434/156
6,359,612 B1 3/2002 Peter et al.
2008/0089587 A1 4/2008 Kim et al.
2008/0244465 A1 10/2008 Kongqiao et al.
2009/0046059 A1 * 2/2009 Hou et al. ..................... 345/156

(Continued)

FOREIGN PATENT DOCUMENTS

CN 1881994 A 12/2006
CN 101730874 A 6/2010

(Continued)

OTHER PUBLICATIONS

Foreign Communication From a Counterpart Application, European Application No. 12759930.6, Extended European Search Report dated Aug. 9, 2013, 6 pages.

(Continued)

Primary Examiner — Priyank Shah
(74) Attorney, Agent, or Firm — Conley Rose, P.C.; Grant Rodolph; Nicholas K. Beaulieu (57) ABSTRACT

A contactless gesture-based control method and apparatus are provided. The method includes: obtaining gestures/movements of a user; obtaining control instructions corresponding to the gestures/movements according to pre-stored mapping relationships; and executing the control instructions, where the gestures/movements include: an index finger draws a circle, and remaining four fingers clench into a fist; or, five fingers clench together and a palm moves in a direction where a device is; or, a thumb, the index finger, and a middle finger extend naturally, the remaining two fingers clench together, and the index finger moves freely; or, the thumb, the index finger, and the middle finger extend naturally, the remaining two fingers clench together, and the thumb moves up and down; or the thumb, the index finger, and the middle finger extend naturally, the remaining two fingers clench together, and the middle finger moves up and down.

23 Claims, 3 Drawing Sheets (56) References Cited

U.S. PATENT DOCUMENTS

| | | | |
|---|---|---|---|
| 2009/0052785 A1 | 2/2009 | Shamaie | |
| 2009/0103780 A1 | 4/2009 | Nishihara et al. | |
| 2009/0217211 A1* | 8/2009 | Hildreth et al. | 715/863 |
| 2009/0278915 A1* | 11/2009 | Kramer et al. | 348/48 |
| 2010/0050133 A1* | 2/2010 | Nishihara et al. | 715/863 |
| 2010/0060576 A1* | 3/2010 | Underkoffler et al. | 345/158 |
| 2010/0066676 A1* | 3/2010 | Kramer et al. | 345/158 |
| 2010/0199232 A1* | 8/2010 | Mistry et al. | 715/863 |
| 2010/0321293 A1* | 12/2010 | Hsiung | 345/158 |
| 2011/0018803 A1* | 1/2011 | Underkoffler et al. | 345/158 |
| 2011/0096954 A1* | 4/2011 | Dahl | 382/103 |
| 2011/0280441 A1* | 11/2011 | Chen et al. | 382/103 |
| 2012/0056804 A1 | 3/2012 | Radivojevic et al. | |
| 2012/0204133 A1* | 8/2012 | Guendelman et al. | 715/863 |
| 2013/0135240 A1* | 5/2013 | Miller | 345/173 |
| 2013/0211843 A1* | 8/2013 | Clarkson | 704/275 |

FOREIGN PATENT DOCUMENTS

| | | |
|---|---|---|
| CN | 101807114 A | 8/2010 |
| CN | 101836207 A | 9/2010 |
| CN | 102053702 A | 5/2011 |
| CN | 102339125 A | 2/2012 |
| KR | 20120047556 A | 5/2012 |
| WO | 2007097548 A1 | 8/2007 |
| WO | 2012011614 A1 | 1/2012 |

OTHER PUBLICATIONS

Foreign Communication From a Counterpart Application, PCT Application PCT/CN2012/075798, Chinese Search Report dated Mar. 7, 2013, 6 pages.

Foreign Communication From a Counterpart Application, PCT Application PCT/CN2012/075798, English Translation of Chinese Search Report dated Mar. 7, 2013, 2 pages.

Foreign Communication From a Counterpart Application, PCT Application PCT/CN2012/075798, Chinese Written Opinion dated Mar. 7, 2013, 4 pages.

Foreign Communication From a Counterpart Application, PCT Application PCT/CN2012/075798, Partial English Translation of Chinese Written Opinion dated Mar. 7, 2013, 3 pages.

Foreign Communication From a Counterpart Application, PCT Application PCT/CN2012/075798, Chinese Search Report Mar. 7, 2013, 3 pages.

Foreign Communication From a Counterpart Application, PCT Application PCT/2012/075798, Partial English Translation of Search Report dated Mar. 7, 2013, 2 pages.

* cited by examiner

CONTACTLESS GESTURE-BASED CONTROL METHOD AND APPARATUS

CROSS-REFERENCE TO RELATED APPLICATION

This application is a continuation of International Application No. PCT/CN2012/075798, filed on May 21, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of human-machine interaction technologies, and in particular, to a contactless gesture-based control method and apparatus.

BACKGROUND

Controlling a device through gestures is one of human-machine interaction technologies. Compared with the traditional graphic user interface, gesture-based control does not require a user to hold a specific input device, and, through specific hand movements, the device can be controlled or specific information can be input into the device.

Existing gesture-based control comes in two main types: tone type is based on location information of a gesture, namely, through spatial movement of a finger, movement of a relevant element on a display screen is mapped; the other type is based on posture information of a gesture, namely, various complicated gestures generated by a human hand correspond to different control commands, so as to control a device.

In related art 1, corresponding gestures are defined for a series of operations such as select, copy, paste, move, delete and switch, for specific displayed objects (such as an icon, box, and scroll bar) on a display screen. For example, a gesture of copying a displayed object is to use one finger to click the object when the object is selected; a gesture of pasting a displayed object is to use one finger to perform double-clicking quickly.

The following defects exist in related art 1: The operation instructions for the displayed object are miscellaneous, and a user needs to memorize too many gesture rules, which makes learning and memorizing difficult.

In related art 2, basic operations (left-click, right-click, cursor displacement) of a mouse are converted into gesture definitions. Unlike the related art 1, the related art 2 does not define specific operations for a displayed object, but defines operations similar to mouse operations to implement all specific operation functions (for example, by selecting a specific operation in a right-click menu).

The following defects exist in the related art 2: Gestures/movements similar to mouse operations vary sharply. When performing a series of operations, a user needs to switch frequently between various movements. For example, when the user needs to select a displayed object and then open a right-click menu, the user needs to move a position by clenching a fist and extending a thumb, and then extend the thumb and the index finger, and then move the thumb. Such a series of movement switches are complicated, which affects the convenience and smoothness of the operation.

SUMMARY

Embodiments of the present invention aim at providing a contactless gesture-based control method to overcome the following problems in the related art: too many gesture rules make it hard to learn and memorize and lead to complicated and unsmooth operations.

The embodiments of the present invention are implemented in the following way. A contactless gesture-based control method includes: obtaining gestures/movements of a user; obtaining control instructions corresponding to the gestures/movements according to pre-stored mapping relationships between the gestures/movements and the control instructions; and executing the control instructions, where: the gestures/movements include: an index finger draws a circle, and remaining four fingers clench into a fist, where the circle is larger than a contour of a hand; or, five fingers clench together and a palm moves in a direction in which a device is; or, a thumb, the index finger, and a middle finger extend naturally, the remaining two fingers clench together, and the index finger moves freely; or, the thumb, the index finger, and the middle finger extend naturally, the remaining two fingers clench together, and the thumb moves up and down; or the thumb, the index finger, and the middle finger extend naturally, the remaining two fingers clench together, and the middle finger moves up and down.

A contactless gesture-based control apparatus is provided in an embodiment of the present invention. The apparatus includes: a gesture/movement obtaining unit configured to obtain gestures/movements of a user; a control instruction obtaining unit configured to obtain, according to pre-stored mapping relationships between the gestures/movements and control instructions, the control instructions corresponding to the gestures/movements obtained by the gesture/movement obtaining unit; and a control instruction executing unit configured to execute the control instructions obtained by the control instruction obtaining unit, where: the gestures/movements include: an index finger draws a circle, and remaining four fingers clench into a fist, where the circle is larger than a contour of a hand; or, five fingers clench together and a palm moves in a direction in which a device is; or, a thumb, the index finger, and a middle finger extend naturally, the remaining two fingers clench together, and the index finger moves freely; or, the thumb, the index finger, and the middle finger extend naturally, the remaining two fingers clench together, and the thumb moves up and down; or the thumb, the index finger, and the middle finger extend naturally, the remaining two fingers clench together, and the middle finger moves up and down.

Compared with the related art, the embodiments of the present invention bring at least the following benefits: First, the number of gesture rules is diminished, which facilitates learning and memorizing by a user; compared with a technical solution 1 in the related art, the embodiments of the present invention slash the number of gesture rules, and the user can perform a majority of operations in a way similar to using a mouse as long as three basic gestures/movements are memorized; secondly, the operations are simple and smooth; compared with a technical solution 2 in the related art, the basic hand postures, extending the thumb, the index finger, and the middle finger, and clenching the remaining two fingers together, which the user poses for performing the three basic gestures, are the same which renders the user operation consecutive without transforming the basic gesture, and smooth shifting between different gestures, thereby enhancing ease of use and practicality. Therefore, the user does not need to change the basic posture when performing operations continuously, and can switch between different gestures smoothly, which enhances ease of use and practicality.

BRIEF DESCRIPTION OF THE DRAWINGS

To illustrate the technical solutions in the embodiments of the present invention more clearly, the following briefly describes the accompanying drawings required for describing the embodiments or the related art. Apparently, the accompanying drawings in the following description merely show some embodiments of the present invention, and persons of ordinary skill in the art can derive other drawings from these accompanying drawings without making creative efforts.

DETAILED DESCRIPTION

To make the objective, technical solution, and advantage of the present invention more comprehensible, the following describes the present invention in detail with reference to the accompanying drawings and exemplary embodiments. It is understandable that the exemplary embodiments are only used to explain the present invention and are not intended to limit the present invention.

In order to illustrate the technical solutions according to the present invention, illustration is provided below through specific embodiments.

Figure 1:
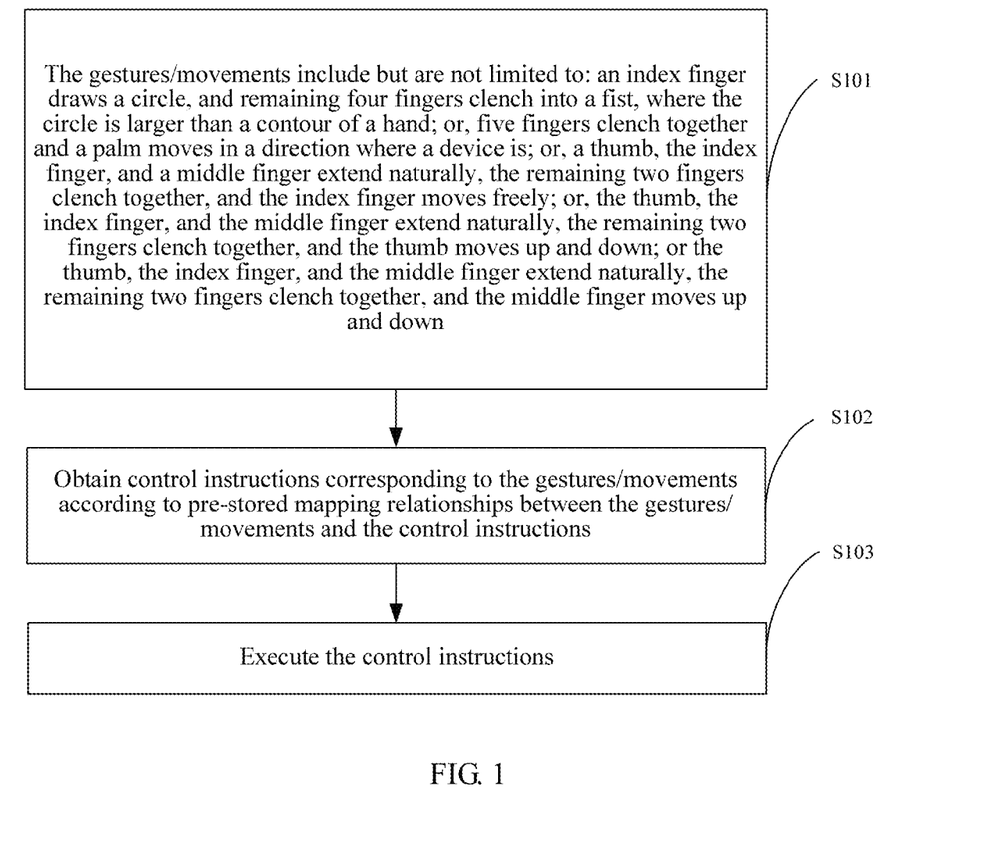
FIG. 1 is a flowchart of implementing a contactless gesture-based control method according to an embodiment of the present invention.

FIG. 1 is a flowchart of implementing a contactless gesture-based control method according to an embodiment of the present invention. The method is detailed below:

In step S101, obtain gestures/movements of a user.

In this embodiment, the gestures/movements of the user can be obtained in many ways, including but are not limited to: using an image collector to collect gesture images of the user, and extracting the gestures/movements out of the gesture images; or, using a reflective posture tracker, an infrared posture tracker or an ultrasonic posture tracker, and so on, to obtain the gestures/movements of the user.

The gestures/movements include but are not limited to: an index finger draws a circle, and remaining four fingers clench into a fist, where the circle is larger than a contour of a hand; or, five fingers clench together and a palm moves in a direction where a device is; or, a thumb, the index finger, and a middle finger extend naturally, the remaining two fingers clench together, and the index finger moves freely; or, the thumb, the index finger, and the middle finger extend naturally, the remaining two fingers clench together, and the thumb moves up and down; or the thumb, the index finger, and the middle finger extend naturally, the remaining two fingers clench together, and the middle finger moves up and down.

In step S102, obtain control instructions corresponding to the gestures/movements according to pre-stored mapping relationships between the gestures/movements and the control instructions.

In this embodiment, before the obtaining the control instructions corresponding to the gestures/movements, the method further includes: creating and storing the mapping relationships between the gestures/movements and the control instructions. Preferably, the gestures/movements include right-hand gestures/movements and left-hand gestures/movements.

The creating and storing the mapping relationships between the gestures/movements and the control instructions specifically includes: obtaining N gestures/movements of the user, where the gestures/movements include a trajectory of a hand, and hand postures of the hand at the start (when the hand enters a preset target area) and at the end (when the hand leaves the preset target area, or when the hand stays in a certain region of the target area for a period of time greater than a preset time value) of the trajectory; selecting N control instructions among pre-edited control instructions, and establishing one-to-one mapping relationships between the N control instructions and the gestures/movements; and storing the mapping relationships, where N is greater than or equal to 1.

Figure 2A:
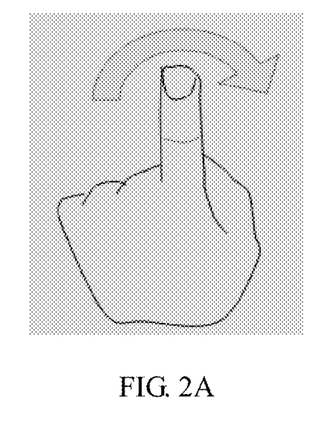
FIGS. 2A, 2B, 2C, 2D, 2E, and 2F are diagrams of gesture examples provided in an embodiment of the present invention.
Figure 2B:
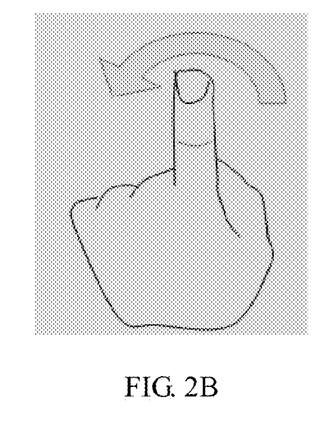
Figure 2C:
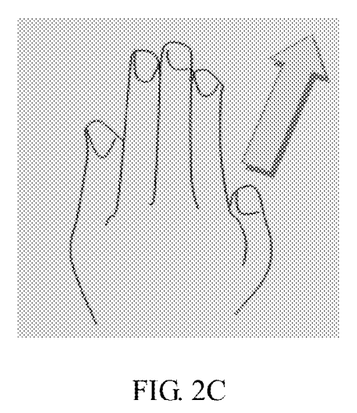
Figure 2D:
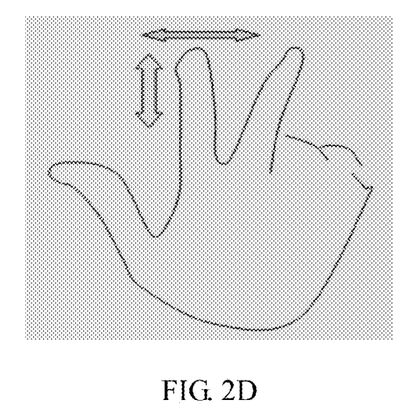
Figure 2E:
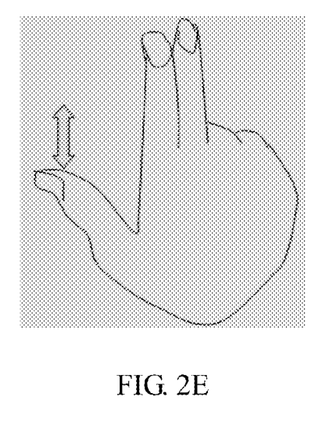
Figure 2F:
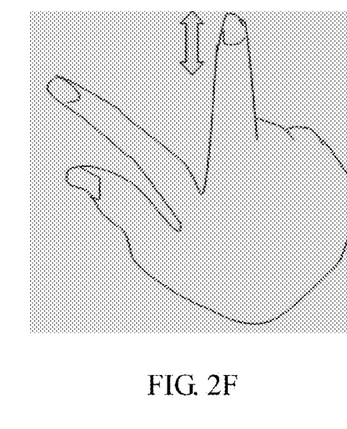

In this embodiment, mapping relationships between right-hand gestures/movements and control instructions include, but are not limited to, at least one of the following:

When the gesture/movement is: the index finger draws a circle and the remaining four fingers clench into a fist, where the circle is larger than the contour of the hand, a corresponding control instruction is "Yes" or "No." Preferably, when the screen displays a "Yes" or "No" option and the gesture/movement is: the index finger draws a circle clockwise and the remaining four fingers clench into a fist, where the circle is larger than the contour of the hand, a corresponding control instruction is "Yes" (as shown in FIG. 2A); when the gesture/movement is: the index finger draws a circle counterclockwise and the remaining four fingers clench into a fist, where the circle is larger than the contour of the hand, the corresponding control instruction is "No" (as shown in FIG. 2B);

When the gesture/movement is: five fingers clench together and the palm moves in a direction where the device is, a corresponding control instruction is "Back," for example, back to a previous page or an upper level of menu (as shown in FIG. 2C);

When the gesture/movement is: the thumb, the index finger and the middle finger extend naturally, the remaining two fingers clench together, and the index finger moves freely, a corresponding control instruction is "the mouse moves along a trajectory of the moving finger" (as shown in FIG. 2D);

When the gesture/movement is: the thumb, the index finger and the middle finger extend naturally, the remaining two fingers clench together, and the thumb moves up and down, a corresponding control instruction is "left-clicking of the mouse" (as shown in FIG. 2E); and When the gesture/movement is: the thumb, the index finger and the middle finger extend naturally, the remaining two fingers clench together, and the middle finger moves up and down, a corresponding control instruction is "right-clicking of the mouse" (as shown in FIG. 2F).

The mapping relationships between left-hand gestures/movements and control instructions include, but are not limited to, at least one of the following:

When the gesture/movement is: the index finger draws a circle and the remaining four fingers clench into a fist, where the circle is larger than the contour of the hand, a corresponding control instruction is "Yes" or "No"; preferably, when the gesture/movement is: the index finger draws a circle counterclockwise and the remaining four fingers clench into a fist, where the circle is larger than the contour of the hand, a corresponding control instruction is "Yes"; when the gesture/movement is: the index finger draws a circle clockwise and the remaining four fingers clench into a fist, where the circle is larger than the contour of the hand, a corresponding control instruction is "No";

When the gesture/movement is: five fingers clench together and the palm moves in a direction where the device is, a corresponding control instruction is "Back";

When the gesture/movement is: the thumb, the index finger and the middle finger extend naturally, the remaining two fingers clench together, and the index finger moves freely, a corresponding control instruction is "the mouse moves along a trajectory of the moving finger";

When the gesture/movement is: the thumb, the index finger and the middle finger extend naturally, the remaining two fingers clench together, and the thumb moves up and down, a corresponding control instruction is "right-clicking of the mouse"; and When the gesture/movement is: the thumb, the index finger and the middle finger extend naturally, the remaining two fingers clench together, and the middle finger moves up and down, a corresponding control instruction is "left-clicking of the mouse."

In step S103, execute the control instructions.

In this embodiment, the system reads and executes the control instructions, so as to implement corresponding functions. For example, the system reads the "Back" instruction, and executes the function of returning to a previous page or an upper level of menu.

It should be noted that the gestures/movements in this embodiment are right-hand gestures/movements by default.

Compared with the related art, the embodiment of the present invention brings at least the following benefits: First, the number of gesture rules is small, which facilitates learning and memorizing by a user; compared with a technical solution 1 in the related art, the embodiment of the present invention slashes the number of gesture rules, and the user can perform a majority of operations in a way similar to using a mouse as long as three basic gestures/movements are memorized; secondly, the operations are simple and smooth. Compared with a technical solution 2 in the related art, the basic hand postures, extending the thumb, the index finger, and the middle finger, and clenching the remaining two fingers together, which the user poses for performing the three basic gestures, are the same which renders the user operation consecutive without transforming the basic gesture, and smooth shifting between different gestures, thereby enhancing ease of use and practicality. Therefore, the user does not need to change the basic posture when performing operations continuously, and can switch between different gestures smoothly. Besides, the definitions of the gestures/movements comply with the user habit. For example, the left-click defined in the embodiment of the present invention is to move the thumb (assumed right hand), and the right-clicking is to move the middle finger (assumed right hand). Such intuitive left-right mapping complies with the user habit, and is easy for the user to learn and memorize, which enhances the ease of use and practicality.

In another embodiment of the present invention, to meet the use requirements of different users (the users who are accustomed to using the right hand or the left hand), which further enhances the ease of use and practicality of the present invention. After step S101 and before step S102, the method further includes: detecting whether the gesture/movement is a right-hand gesture/movement or a left-hand gesture/movement; if the gesture/movement is a right-hand gesture/movement, obtaining the control instruction corresponding to the right-hand gesture/movement according to the mapping relationship between the right-hand gesture/movement and the control instruction; if the gesture/movement is a left-hand gesture/movement, obtaining the control instruction corresponding to the left-hand gesture/movement according to the mapping relationship between the left-hand gesture/movement and the control instruction.

The details of detecting whether the gesture/movement is a right-hand gesture/movement or a left-hand gesture/movement are: presetting a left target area and a right target area (a mid point between two eyes on the human face or the nose may be used as a dividing line, and a left part is the left target area and a right part is the right target area); detecting whether the gesture/movement is in the left target area or the right target area; if the gesture/movement is in the left target area, the gesture/movement is a left-hand gesture/movement; otherwise, the gesture/movement is a right-hand gesture/movement.

Figure 3:
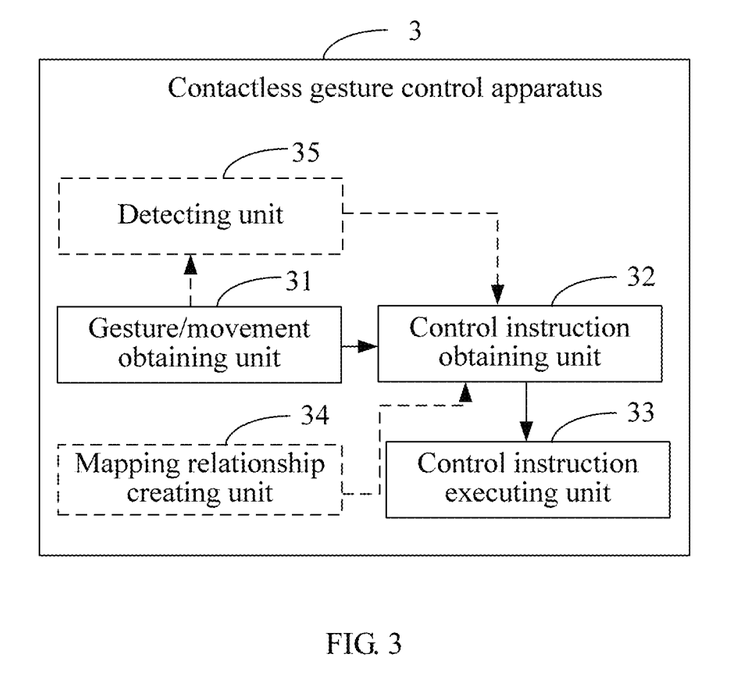
FIG. 3 is a compositional structural diagram of a contactless gesture-based control apparatus according to an embodiment of the present invention.

FIG. 3 is a compositional structural diagram of a contactless gesture-based control apparatus according to a second embodiment of the present invention. For ease of description, only the part related to this embodiment of the present invention is illustrated.

The contactless gesture-based control apparatus may be a software unit or a hardware unit that runs on various electronic devices (including a mobile phone, desktop computer, tablet computer, television set, refrigerator, washing machine, air conditioner, digital camera, monitoring camera, medical electronic instrumentation, and so on), or may be a unit combining software and hardware.

The contactless gesture-based control apparatus 3 includes a gesture/movement obtaining unit 31, a control instruction obtaining unit 32, and a control instruction executing unit 33. Specific functions of the units are as follows:

The gesture/movement obtaining unit 31 is configured to obtain a gesture/movement of a user; preferably, the gesture/movement obtaining unit 31 is specifically configured to: use an image collector to collect a gesture image of the user, and extract the gesture/movement out of the gesture image; or, use a reflective posture tracker, an infrared posture tracker or an ultrasonic posture tracker to obtain the gesture/movement of the user.

The control instruction obtaining unit 32 is configured to obtain, according to pre-stored mapping relationships between gestures/movements and control instructions, control instructions corresponding to the gestures/movements obtained by the gesture/movement obtaining unit 31.

The control instruction executing unit 33 is configured to execute the control instructions obtained by the control instruction obtaining unit 32.

The gestures/movements include but are not limited to: an index finger draws a circle, and remaining four fingers clench into a fist, where the circle is larger than a contour of a hand; or, five fingers clench together and a palm moves in a direction where a device is; or, a thumb, the index finger, and a middle finger extend naturally, the remaining two fingers clench together, and the index finger moves freely; or, the thumb, the index finger, and the middle finger extend naturally, the remaining two fingers clench together, and the thumb moves up and down; or the thumb, the index finger, and the middle finger extend naturally, the remaining two fingers clench together, and the middle finger moves up and down.

Further, the apparatus 3 further includes: a mapping relationship creating unit 34 configured to: before the control instruction obtaining unit 32 obtains the control instructions corresponding to the gestures/movements obtained by the gesture/movement obtaining unit 31, create and store the mapping relationships between the gestures/movements and the control instructions, where the gestures/movements include right-hand gestures/movements and left-hand gestures/movements; and a detecting unit 35 configured to: after the gesture/movement obtaining unit 31 obtains the gestures/movements and before the control instruction obtaining unit 32 obtains the control instructions corresponding to the gestures/movements, detect whether the gesture/movement is a right-hand gesture/movement or a left-hand gesture/movement.

In this embodiment, the mapping relationships between the right-hand gestures/movements and the control instructions include, but are not limited to, at least one of the following:

When the gesture/movement is: the index finger draws a circle and the remaining four fingers clench into a fist, where the circle is larger than the contour of the hand, a corresponding control instruction is "Yes" or "No"; preferably, when the gesture/movement is: the index finger draws a circle clockwise and the remaining four fingers clench into a fist, where the circle is larger than the contour of the hand, a corresponding control instruction is "Yes"; when the gesture/movement is: the index finger draws a circle counterclockwise and the remaining four fingers clench into a fist, where the circle is larger than the contour of the hand, a corresponding control instruction is "No";

When the gesture/movement is: five fingers clench together and the palm moves in a direction where the device is, a corresponding control instruction is "Back";

When the gesture/movement is: the thumb, the index finger and the middle finger extend naturally, the remaining two fingers clench together, and the index finger moves freely, a corresponding control instruction is "the mouse moves along a trajectory of the moving finger";

When the gesture/movement is: the thumb, the index finger and the middle finger extend naturally, the remaining two fingers clench together, and the thumb moves up and down, a corresponding control instruction is "left-clicking of the mouse"; and When the gesture/movement is: the thumb, the index finger and the middle finger extend naturally, the remaining two fingers clench together, and the middle finger moves up and down, a corresponding control instruction is "right-clicking of the mouse."

The mapping relationships between the left-hand gestures/movements and the control instructions include, but are not limited to, at least one of the following:

When the gesture/movement is: the index finger draws a circle and the remaining four fingers clench into a fist, where the circle is larger than the contour of the hand, a corresponding control instruction is "Yes" or "No"; preferably, when the gesture/movement is: the index finger draws a circle counterclockwise and the remaining four fingers clench into a fist, where the circle is larger than the contour of the hand, a corresponding control instruction is "Yes"; when the gesture/movement is: the index finger draws a circle clockwise and the remaining four fingers clench into a fist, where the circle is larger than the contour of the hand, a corresponding control instruction is "No";

When the gesture/movement is: five fingers clench together and the palm moves in a direction where the device is, a corresponding control instruction is "Back";

When the gesture/movement is: the thumb, the index finger and the middle finger extend naturally, the remaining two fingers clench together, and the index finger moves freely, a corresponding control instruction is "the mouse moves along a trajectory the moving finger";

When the gesture/movement is: the thumb, the index finger and the middle finger extend naturally, the remaining two fingers clench together, and the thumb moves up and down, a corresponding control instruction is "right-clicking of the mouse"; and When the gesture/movement is: the thumb, the index finger and the middle finger extend naturally, the remaining two fingers clench together, and the middle finger moves up and down, a corresponding control instruction is "left-clicking of the mouse."

The contactless gesture-based control apparatus provided in this embodiment can use the contactless gesture-based control method described above. For details, see the description about the first embodiment of the contactless gesture-based control method above, which is not repeated herein.

Overall, compared with the related art, the embodiment of the present invention brings at least the following benefits: First, the number of gesture rules is small, which facilitates learning and memorizing by a user; compared with a technical solution 1 in the related art, the embodiment of the present invention slashes the number of gesture rules, and the user can perform a majority of operations in a way similar to using a mouse as long as three basic gestures/movements are memorized; secondly, the operations are simple and smooth. Compared with a technical solution 2 in the related art, the technical solution of the present invention provides basic hand postures that are the same when the user performs three basic gestures, extending the thumb, the index finger, and the middle finger, and clenching the remaining two fingers together. Therefore, the user does not need to change the basic posture when performing operations continuously, and can switch between different gestures smoothly. Moreover, the definitions of the gestures/movements comply with the user habit. For example, the left-click defined in the embodiment of the present invention is to move the thumb (assumed right hand), and the right-clicking is to move the middle finger (assumed right hand). Such intuitive left-right mapping complies with the user habit, and is easy for the user to learn and memorize, which enhances the ease of use and practicality. Besides, at the time of creating and storing the mapping relationships between the gestures/movements and the control instructions, the mapping relationships between the right-hand gestures/movements and the control instructions as well as the mapping relationships between the left-hand gestures/movements and the control instructions are created and stored, thereby meeting the use requirements of different users (the users who are accustomed to using right hands or left hands) and further enhancing the ease of use and practicality.

All of or a part of the steps of contactless gesture-based control method provided by the embodiments of the present invention may be implemented by a program instructing relevant hardware. For example, implementation may be performed by using a computer to run the program. The program may be stored in a readable storage medium, such as a random access memory, a magnetic disk, and an optical disk.

What is claimed is:

1. A contactless gesture-based control method, comprising:
   creating and storing pre-stored mapping relationships between gestures/movements and control instructions;
   obtaining gestures/movements of a user;
   obtaining the control instructions corresponding to the gestures/movements according to the pre-stored mapping relationships between the gestures/movements and the control instructions; and
   executing the control instructions,
   wherein the gestures/movements comprise that three fingers including a thumb, an index finger, and a middle finger extend naturally, that two fingers including a ring finger and a pinkie finger are clenched together, and that one of the three fingers moves, and wherein the mapping relationships between the gestures/movements and the control instructions comprise:

a corresponding control instruction is "a mouse moves along a trajectory of a moving finger" when the gestures/movements comprise the thumb, the index finger, and the middle finger extend naturally, the remaining two fingers clench together, and the index finger moves freely;

a corresponding control instruction is "left-clicking of a mouse" when the gestures/movements comprise the thumb, the index finger, and the middle finger extend naturally, the remaining two fingers clench together, and the thumb moves up and down; and a corresponding control instruction is "right-clicking of a mouse" when the gestures/movements comprise the thumb, the index finger, and the middle finger extend naturally, the remaining two fingers clench together, and the middle finger moves up and down.

2. The method according to claim 1, wherein the gestures/movements comprise right-hand gestures/movements and left-hand gestures/movements.

3. The method according to claim 2, wherein after obtaining the gestures/movements of the user and before obtaining the control instructions corresponding to the gestures/movements according to the pre-stored mapping relationships between the gestures/movements and the control instructions, the method further comprises detecting whether the gestures/movements comprise a right-hand gesture/movement or a left-hand gesture/movement.

4. The method according to claim 2, wherein the mapping relationships between the right-hand gestures/movements and the control instructions further comprise at least one of the following:

a corresponding control instruction is "Yes" or "No" when the gestures/movements comprise the index finger draws a circle and the remaining four fingers clench into a fist, wherein the circle is larger than a contour of the hand; and a corresponding control instruction is "Back" when the gestures/movements comprise the five fingers clench together and the palm moves in a direction of a device.

5. The method according to claim 4, wherein the corresponding control instruction is "Yes" when the gestures/movements comprise the index finger draws the circle clockwise and the remaining four fingers clench into the fist, wherein the circle is larger than the contour of the hand, and wherein the corresponding control instruction is "No" when the gestures/movements comprise the index finger draws the circle counterclockwise and the remaining four fingers clench into the fist, wherein the circle is larger than the contour of the hand.

6. The method according to claim 1, wherein obtaining the gestures/movements of the user comprises:

using an image collector to collect gesture images of the user, and extracting the gestures/movements out of the gesture images; or using a reflective posture tracker, an infrared posture tracker, or an ultrasonic posture tracker to obtain the gestures/movements of the user.

7. A contactless gesture-based control apparatus, comprising:

a mapping relationship creating unit configured to create and store pre-stored mapping relationships between gestures/movements and control instructions;

a gesture/movement obtaining unit configured to obtain gestures/movements of a user;

a control instruction obtaining unit configured to obtain, according to the pre-stored mapping relationships between the gestures/movements and control instructions, the control instruction corresponding to the gestures/movements obtained by the gesture/movement obtaining unit; and a control instruction executing unit configured to execute the control instruction obtained by the control instruction obtaining unit, wherein the gestures/movements comprise that three fingers including a thumb, an index finger, and a middle finger extend naturally, that two fingers including a ring finger and a pinkie finger are clenched together, and that one of the three fingers moves, and wherein the mapping relationships between the gestures/movements and the control instructions comprise:

a corresponding control instruction is "a mouse moves along a trajectory of a moving finger" when the gestures/movements comprise the thumb, the index finger, and the middle finger extend naturally, the remaining two fingers clench together, and the index finger moves freely;

a corresponding control instruction is "left-clicking of a mouse" when the gestures/movements comprise the thumb, the index finger, and the middle finger extend naturally, the remaining two fingers clench together, and the thumb moves up and down; and a corresponding control instruction is "right-clicking of a mouse" when the gestures/movements comprise the thumb, the index finger, and the middle finger extend naturally, the remaining two fingers clench together, and the middle finger moves up and down.

8. The apparatus according to claim 7, wherein the gestures/movements comprise right-hand gestures/movements and left-hand gestures/movements, and wherein the apparatus further rises a detecting unit configured to, after the gesture/movement obtaining unit obtains the gestures/movements and before the control instruction obtaining unit obtains the control instruction corresponding to the gestures/movements, detect whether the gestures/movements comprise a right-hand gesture/movement or a left-hand gesture/movement.

9. The apparatus according to claim 8, wherein the mapping relationships between the right-hand gestures/movements and the control instructions comprise at least one of the following:

a corresponding control instruction is "Yes" or "No" when the gestures/movements comprise the index finger draws a circle and the remaining four fingers clench into a fist, wherein the circle is larger than a contour of the hand; and a corresponding control instruction is "Back" when the gestures/movements comprise the five fingers clench together and the palm moves in a direction of a device.

10. The apparatus according to claim 9, wherein the corresponding control instruction is "Yes" when the gestures/movements comprise the index finger draws the circle clockwise and the remaining four fingers clench into the fist, wherein the circle is larger than the contour of the hand, and wherein the corresponding control instruction is "No" when the gestures/movements comprise the index finger draws the circle counterclockwise and the remaining four fingers clench into the fist, wherein the circle is larger than the contour of the hand.

11. The apparatus according to claim 7, wherein the gesture/movement obtaining unit is specifically configured to:
use an image collector to collect a gesture image of the user, and extract the gestures/movements out of the gesture image; or
use a reflective posture tracker, an infrared posture tracker, or an ultrasonic posture tracker to obtain the gestures/movements of the user.

12. The method according to claim 1, wherein the one of the three fingers moves comprises the thumb moving.

13. The method according to claim 1, wherein the one of the three fingers moves comprises the index finger moving.

14. The method according to claim 1, wherein the one of the three fingers moves comprises the middle finger moving.

15. The apparatus according to claim 7, wherein the one of the three fingers moves comprises the thumb moving.

16. The apparatus according to claim 7, wherein the one of the three fingers moves comprises the index finger moving.

17. The apparatus according to claim 7, wherein the one of the three fingers moves comprises the middle finger moving.

18. A contactless gesture-based control method, comprising:
creating and storing pre-stored mapping relationships between gestures/movements and control instructions;
obtaining gestures/movements of a user;
obtaining the control instructions corresponding to the gestures/movements according to the pre-stored mapping relationships between the gestures/movements and the control instructions; and
executing the control instructions,
wherein the gestures/movements comprise that three fingers including a thumb, an index finger, and a middle finger extend naturally, that two fingers including a ring finger and a pinkie finger are clenched together, and that one of the three fingers moves, and
wherein the mapping relationships between the gestures/movements and the control instructions comprise:
a corresponding control instruction is "a mouse moves along a trajectory of a moving finger" when the gestures/movements comprise the thumb, the index finger, and the middle finger extend naturally, the remaining two fingers clench together, and the index finger moves freely;
a corresponding control instruction is "right-clicking of a mouse" when the gestures/movements comprise the thumb, the index finger, and the middle finger extend naturally, the remaining two fingers clench together, and the thumb moves up and down; and
a corresponding control instruction is "left-clicking of a mouse" when the gestures/movements comprise the thumb, the index finger, and the middle finger extend naturally, the remaining two fingers clench together, and the middle finger moves up and down.

19. The method according to claim 18, wherein the mapping relationships between the gestures/movements and the control instructions further comprise at least one of the following:
a corresponding control instruction is "Yes" or "No" when the gestures/movements comprise the index finger draws a circle and the remaining four fingers clench into a fist, wherein the circle is larger than a contour of a hand; and
a corresponding control instruction is "Back" when the gestures/movements comprise the five fingers clench together and the palm moves in a direction of a device.

20. The method according to claim 18, wherein the corresponding control instruction is "Yes" when the gestures/movements comprise the index finger draws the circle counterclockwise and the remaining four fingers clench into the fist, wherein the circle is larger than the contour of the hand, and wherein the corresponding control instruction is "No" when the gestures/movements comprise the index finger draws the circle clockwise and the remaining four fingers clench into the fist, wherein the circle is larger than the contour of the hand.

21. A contactless gesture-based control apparatus, comprising:
a mapping relationship creating unit configured to create and store pre-stored mapping relationships between gestures/movements and control instructions;
a gesture/movement obtaining unit configured to obtain gestures/movements of a user;
a control instruction obtaining unit configured to obtain, according to the pre-stored mapping relationships between the gestures/movements and control instructions, the control instruction corresponding to the gestures/movements obtained by the gesture/movement obtaining unit; and
a control instruction executing unit configured to execute the control instruction obtained by the control instruction obtaining unit,
wherein the mapping relationships between the gestures/movements and the control instructions comprise:
a corresponding control instruction is "Yes" or "No" when the gestures/movements comprise the index finger draws a circle and the remaining four fingers clench into a fist, wherein the circle is larger than a contour of a hand;
a corresponding control instruction is "Back" when the gestures/movements comprise the five fingers clench together and the palm moves in a direction of a device;
a corresponding control instruction is "a mouse moves along a trajectory of a moving finger" when the gestures/movements comprise the thumb, the index finger, and the middle finger extend naturally, the remaining two fingers clench together, and the index finger moves freely;
a corresponding control instruction is "right-clicking of a mouse" when the gestures/movements comprise the thumb, the index finger, and the middle finger extend naturally, the remaining two fingers clench together, and the thumb moves up and down; and
a corresponding control instruction is "left-clicking of a mouse" when the gestures/movements comprise the thumb, the index finger, and the middle finger extend naturally, the remaining two fingers clench together, and the middle finger moves up and down.

22. The apparatus according to claim 21, wherein the mapping relationships between the gestures/movements and the control instructions further comprise at least one of the following:
a corresponding control instruction is "Yes" or "No" when the gestures/movements comprise the index finger draws a circle and the remaining four fingers clench into a fist, wherein the circle is larger than a contour of a hand; and
a corresponding control instruction is "Back" when the gestures/movements comprise the five fingers clench together and the palm moves in a direction of a device.

23. The apparatus according to claim 22, wherein the corresponding control instruction is "Yes" when the gestures/movements comprise the index finger draws the circle counterclockwise and the remaining four fingers clench into the fist, wherein the circle is larger than the contour of the hand, and wherein the corresponding control instruction is "No" when the gestures/movements comprise the index finger draws the circle clockwise and the remaining four fingers clench into the fist, wherein the circle is larger than the contour of the hand.

* * * * *

UNITED STATES PATENT AND TRADEMARK OFFICE
CERTIFICATE OF CORRECTION

| | | |
|---|---|---|
| PATENT NO. | : 8,866,781 B2 | Page 1 of 1 |
| APPLICATION NO. | : 13/875476 | |
| DATED | : October 21, 2014 | |
| INVENTOR(S) | : Yingtao Li | |

It is certified that error appears in the above-identified patent and that said Letters Patent is hereby corrected as shown below:

IN THE CLAIMS:

Column 10, Lines 36-45, Claim 8 should read:

The apparatus according to claim 7, wherein the gestures/movements comprise right-hand gestures/movements and left-hand gestures/movements, and wherein the apparatus further comprises a detecting unit configured to, after the gesture/movement obtaining unit obtains the gestures/movements and before the control instruction obtaining unit obtains the control instruction corresponding to the gestures/movements, detect whether the gestures/movements comprise a right-hand gesture/movement or a left-hand gesture/movement.

Signed and Sealed this
Third Day of February, 2015

Michelle K. Lee
*Deputy Director of the United States Patent and Trademark Office*